United States Patent Office

3,362,783
Patented Jan. 9, 1968

3,362,783
TREATMENT OF EXHAUST GASES
Robert J. Leak, Wappingers Falls, N.Y., assignor to Texaco Inc., New York, N.Y., a corporation of Delaware
No Drawing. Filed Dec. 23, 1963, Ser. No. 332,899
4 Claims. (Cl. 23—2)

This application is a continuation-in-part of my copending application Ser. No. 202,378, filed June 14, 1962, and now abandoned, and copending application Ser. No. 247,336, filed Dec. 26, 1962, now Patent No. 3,231,520.

This invention relates to a method of and catalyst for treatment of exhaust gases from internal combustion engines, and to a method of making catalytic structures useful for this purpose. In one of its more specific aspects, this invention relates to catalytic structures effective for promoting oxidation of residual combustible materials in exhaust gases of internal combustion engines.

Internal combustion engines generally operate at fuel-air mixtures which are richer than stoichiometric, with the result that the exhaust products of combustion contain residual combustible compounds including carbon monoxide, hydrogen and hydrocarbons. In recent years, automotive exhaust gas pollution control has become exceedingly important, and numerous methods have been proposed for promoting oxidation of residual combustible compounds in exhaust gas systems. For this purpose, afterburners or catalytic combustion chambers have been proposed for use in exhaust systems. The catalytic combustion chambers generally comprise an oxidation catalyst supported on a ceramic or refractory base.

In order to increase the octane rating of the fuel, an organic lead compound, such as tetraethyllead, is often added to motor fuels. Some lead compounds contained in the exhaust products from the engine operated on such fuels adversely affect many oxidation catalysts which might be employed in exhaust systems thereby decreasing the activity of the catalysts in a relatively short period of time.

It is an object of my invention to provide an improved method and catalytic structure for reducing, or substantially removing, the combustible compounds in the exhaust gases from internal combustion engines. It is another object of this invention to provide a catalytic structure which is capable of operating effectively for long periods of time on exhaust gases containing lead compounds resulting from combustion of fuels containing lead antiknock compounds. Another object of this invention is to provide an improved method and apparatus for the substantially complete oxidation of the combustible compounds in the exhaust gases. Still another object is to provide a method of preparing catalyst structures of the above type.

The novel catalytic structure of this invention comprises a substrate, preferably of extended dimensions, having an adherent film or layer of alumina formed thereon. The film of alumina deposited or formed on the substrate is sufficiently tenacious to withstand ordinary usage and is not damaged or impaired upon relatively severe abrading, jarring, etc. Suitable catalyst material is deposited upon the film of alumina adhering to the substrate, which material may be deposited in a form possessing catalytic activity or capable of being rendered catalytically active by subsequent treatment, as explained more fully hereinbelow. The catalyst material promotes the catalytic oxidation of the residual combustible compounds of the exhaust gases and exhibits good activity over a long period of use. Air is admixed with the exhaust gases to promote the catalytic oxidation of the combustible materials. Air may be added at any desirable point in the exhaust system, such as at the exhaust manifold, at the muffler or in the exhaust pipe prior to the point of contact of exhaust gases with the catalyst.

It is often advantageous to conduct the oxidation at superatmospheric pressure. In some instances it may be desirable to employ a mechanical valve to maintain a backpressure on the exhaust gases in contact with the catalyst. In some instances, the catalyst element or section comprising the catalyst may be so designed as to provide a suitable backpressure on the gases in contact with the oxidation catalyst.

The catalytic structure of this invention is made up of a substrate of extended surface having a catalytic coating thereon. The substrate is preferably of extended dimensions, e.g., metal mesh or metal wool, providing structural stability and a surface area substantially greater than that of discrete particles. The extended substrate is not restricted to any particular configuration or any particular material. The substrate may be formed of a metal or non-metal of sufficient strength and mechanical stability for use in a catalytic reactor, and may include, for example, steel, stainless steel, aluminum, copper, nickel and titanium, including sintered metal materials, and refractory or ceramic materials including, for example, high melting glass, refractory metal oxides, e.g., magnesia and silica, and refractory metal silicates and carbides. A metal substrate is particularly advantageous in that metals are characterized by relatively high thermal conductivity.

In accordance with this invention, the substrate employed in the catalyst structure is provided with an adherent film of alumina formed by contacting the substrate with a solution of an alkali metal aluminate, e.g., sodium aluminate. The configuration of the substrate may include bars, balls, chain, wool, mesh, plates, saddles, sheet, tubes, wire or the like.

Although the invention is described herein in detail with reference to employing a sodium aluminate solution, it should be understood that a solution of potassium aluminate is also satisfactory for use in forming an adherent film of alumina on the substrate.

In preparing the catalytic structure, the substrate is contacted with an aqueous solution of sodium aluminate or potassium aluminate whereby an adherent film of alumina is formed thereon, the resulting film being hard, firm and tenacious. X-ray diffraction analysis indicates that the alumina formed or deposited from the sodium aluminate solution is chiefly the trihydrate phase, either as the alpha or beta trihydrate phase. The particular phase initially deposited onto the substrate appears to be largely dependent on the temperature of the sodium aluminate solution employed. Thus, solutions at about room temperature result in the formation of a film comprising about 50% by weight alpha alumina trihydrate and 50% by weight beta alumina trihydrate; whereas, employing sodium aluminate solutions at elevated temperatures, e.g., 125° F. or higher, generally results in a film comprising alpha alumina trihydrate. The phase of hydrated alumina formed on the substrate may be significant in that further transformation of the alumina may be effected where desired, upon dehydration on heating or mild calcination, as explained below in detail. However, the alumina film formed on the substrate may contain a small quantity of some other phase or phases of alumina, as well as several tenths percent sodium oxide (which may be present as sodium aluminate). It should be understood, however, that the alumina film initially deposited on the substrate may be regarded as substantially a hydrate of alumina, and is intended to embrace the film formed on the substrate from a solution of sodium aluminate, which film may undergo additional phase transformation.

The sodium aluminate or potassium aluminate solution may be obtained or prepared by any known methods. For example, aluminum pellets or alumina may be dissolved in a relatively strong aqueous solution of sodium hydroxide. The substrate is contacted with the resulting solution of sodium aluminate, preferably in the presence of metallic aluminum, for a period of time sufficient to form an adherent film of alumina on the surface of the substrate. Generally, the concentration of the sodium aluminate solution should not be less than 0.5 molar, and preferably at least 1 molar, in order to deposit or form a film of alumina of sufficient depth to be serviceable within a reasonable period of time. Generally, a solution having a concentration of about 1 to 5 molar is satisfactory. Where desired, more or less concentrated solutions may be employed, e.g., 0.1 molar to 30 molar but there appears to be no advantage in employing solutions having a concentration greater than 10 molar or less than 0.5 molar.

Although a solution of sodium aluminate at room temperature may be used, formation of the alumina film is somewhat facilitated by contacting the substrate with a solution of sodium aluminate maintained at an elevated temperature. However, as explained above, the temperature of the solution determines to a considerable extent the particular alumina phase formed. Thus, for example, in depositing a film of alpha alumina trihydrate on the substrate it is desirable to employ a solution having a temperature above 125° F. and preferably about 175 to 212° F.

The substrate may be contacted with the solution of sodium aluminate as by immersing the substrate when in particulate form, e.g., saddles, spheres, mesh, etc., in the solution; or in forming the alumina film on the interior wall of a tube of substantial length, sodium aluminate solution is added to the tube and permitted to stand therein in a vertical position in order to provide for a film of uniform thickness, preferably in the presence of metallic aluminum. The resulting film of alumina formed on the substrate should be of sufficient thickness to provide adequate capacity for retaining the catalyst deposited thereon. To insure adequate performance under the conditions encountered in catalytic processing, however, the film of alumina formed should not be substantially thinner than about 1 mil, and preferably not less than about 10 mils, usually 10 to 100 mils being desirable.

In the preferred embodiment of this invention, the alumina in hydrate form deposited on the substrate as an adherent film is subjected to heating to 550 to 1500° F. to drive off at least part of the water of hydration thereby resulting in the transformation of the alumina hydrate to a lower state, or degree, of hydration and also to a higher density alumina. Such transformation accompanying heating is well known in the art, and may be found discussed in "Alumina Properties" by J. W. Newsome et al. (Aluminum Company of America, 1960, Second Revision). The temperature required in effecting transformation of the hydrate of alumina depends on such factors as pressure, atmosphere, heating rate and impurities. Thus, for example, both alpha alumina trihydrate and beta alumina trihydrate deposited from a solution of sodium aluminate, as explained above, may be dehydrated to the monohydrate phase upon mild calcining in an atmosphere of air to about 390 to 750° F. and at slightly elevated pressure. The resulting monohydrate phase may be subjected to further heating to about 1000 to 1500° F. thereby transforming it to the gamma phase. On the other hand, beta alumina trihydrate may be transferred to eta alumina upon heating in dry air at a slow rate to about 550 to 950° F. Transformation to gamma alumina or eta alumina is particularly advantageous in that these phases have a large total surface area per unit weight, the surface area being substantially higher than the amorphous forms of alumina, thereby increasing the catalytic activity, per se, and, more importantly, resulting in a carrier characterized by a high adsorptive property.

The method utilized in depositing the catalyst material upon the alumina film is dependent to some extent upon the particular catalyst material employed. In one method, a metal-containing catalyst material is deposited by chemically reducing, e.g., with hydrogen, a solution containing a soluble compound of the catalyst material in the presence of the substrate bearing the alumina film under such conditions as to effect a substantially uniform deposition of the catalyst material upon the alumina surface. Although the exact form of the deposit of catalyst material cannot be definitely determined, it is believed that the material is deposited from solution as elemental metal or its intermediate product of reduction, such as the oxide. Chemical reducton of the deposit is particularly useful in those instances where the elemental metal or its intermediate product of reduction, exhibits the required catalytic activity, or where a deposit of the metal may be rendered active upon subsequent treatment. In several cases, a compound of the metal forms with a stabilizing agent a soluble complex which may be readily reduced to the elemental metal or its intermediate product of reduction with a suitable reducing agent, preferably a reducing gas, for example, hydrogen. Suitable stabilizing agents include complexing agents which form soluble complex ions of the co-ordinate complex type, sequestering agents, chelating agents, dispersants and detergents. Thus, for example, compounds or salts of numerous metals useful in preparing oxidation catalysts form with ammonia a co-ordination type complex.

Metals useful in the preparation of the catalyst in accordance with this invention include copper, silver, zinc, chromium, vanadium, manganese, cobalt, molybdenum, tungsten, nickel, platinum and iron, and combinations thereof. Preferably, the metals include those from the group consisting of Group VIII of the Periodic Table of Elements and Period 4 of the Periodic Table. The metals from Group VIII include, for example, nickel, platinum, iron and cobalt and combinations thereof, and those metals from Period 4 include, for example, copper, vanadium, chromium, manganese, cobalt and nickel, and combinations thereof. The deposit is generally heated or calcined at a suitable temperature for purposes of conditioning the catalyst. In particular, vanadium pentoxide and complexes of copper oxide and copper chromite are useful as catalysts in the present invention, particularly in combination wherein the exhaust gases first contact the vanadium pentoxide catalyst and then contact the copper oxide-copper chromite catalyst.

The non-metallic ions and anions of the metal compound or salt to be precipitated by chemical reduction from a solution containing the metal or metals may be of any inorganic acid or strong organic acid which forms a soluble salt of the metal and is not reduced under precipitation conditions. Those anions generally employed include sulfate, chloride, nitrate, carbonate, and acetate. The solvent generally used is water, but suitable organic solvents including alcohols, aldehydes, ethers, ketones, toluene and pyridine, may be used as may liquid ammonia.

Although ammonia is the preferred stabilizing agent, and the invention is described in greater detail in connection with solutions of this type, certain other stabilizing agents may be employed. Other suitable stabilizing agents include the organic primary, secondary and tertiary amines, such as methylamine, ethylene diamine, diethylene triamine. In addition, stabilizing agents may include phosphates, especially pyrophosphate, and metaphosphate, as well as citrate, acetate, oxalate, tartrate, o-phenanthroline, thiocyanate, thiosulfate, thiourea, pyridine, quinoline and cyano groups. Still further useful complex formations include the chloro, hydroxo and aquo complexes, such as the aquo-ammonia complexes. Olefin and olefin-like compounds are also useful, and may include for example, ethylene, propylene, butadiene, etc., as well as the unsaturated cyclic compounds such as cyclohexene and styrene. However, the olefin and olefin-like compounds are desirably employed in non-aqueous solvent, for example, benzene, toluene, pyridine, acetone and ether.

The catalyst material may be deposited upon the surface of the extended substrate by the action of a reducing agent, preferably hydrogen, on a solution containing a soluble complex of the catalyst material, such as an ammoniacal solution of a salt of the catalyst material. The concentration of the particular metal in solution will depend to a considerable extent upon the metal employed. Generally there appears to be no benefit from employing concentrations in excess of about 5 molar, but the concentration of a metal in solution should be less than that at which a substantial amount will precipitate out in particulate form which may be determined by experiment by one skilled in the art. A concentration of less than about 0.01 molar is usually too low for effecting reduction within a reasonable period of time. I have found a concentration of 0.5 to 2 molar to be generally satisfactory, but with the more rare or expensive elements, the concentration may be advantageously as low as 0.04 molar. The temperature and pressure employed in the reducing step depend somewhat upon the material undergoing reduction and may vary over a wide range. However, reduction proceeds advantageously at elevated temperature usually within a range of from about 250 to 500° F., and under a partial pressure of from about 300 to 4000 pounds per square inch or higher. Although higher temperatures and pressures may increase slightly the plating phenomenon, this increase generally is not practical.

It should be understood that other reducing gases, such as carbon monoxide, may be used with satisfactory results, as may other reducing agents, such as hydrazine, hydroxylamine, glyoxal, formaldehyde and sulfur dioxide.

As an alternative procedure, the added oxidation catalyst material may be impregnated on the alumina film by contacting the oxide coated substrate with a solution containing the catalyst material. Generally, this is accomplished by immersing the alumina coated substrate in a solution of a salt of the catalyst material. The conditions for impregnating, i.e., concentration, temperature, time and pH, will depend largely upon the material employed and upon the amount of catalyst material required. Although aqueous solutions are usually employed, the catalyst material may be impregnated on the alumina carrier from a non-aqueous solution particularly acetone, ethanol and the like. The deposit is then calcined and activated in place as by oxidizing, reducing, sulfiding, etc. By this method, the alumina film may be impregnated with such catalyst materials as salts or compounds of such metals as copper, silver, zinc, chromium, vanadium, manganese, cobalt, tungsten, nickel, platinum and iron, and combinations thereof. Preferably, the metals include those from the group consisting of Group VIII of the Periodic Table of Elments and Period 4 of the Periodic Table. The metals from Group VIII include, for example, nickel, platinum, iron and cobalt and combinations thereof, and the metals from Period 4 include, for example, copper, vanadium, chromium, manganese, cobalt and nickel, and combinations thereof, e.g., combinations of chromium and copper. Vanadium pentoxide and copper oxide-copper chromite catalysts so prepared are particularly useful in this invention.

In still another method, the oxidation catalyst material may be deposited on the alumina film by pasting as from a slurry of the material. For example, copper oxide, chromium oxide or zinc oxide may be pasted on the alumina coated substrate, and then calcined at a suitable temperature for purposes of conditioning the catalyst.

In order to assure deposition of the desired quantity of the catalyst material, it may be necessary in some cases to repeat the particular process employed in depositing the material, including the successive steps of deposition, and drying or activation where required. It should be understood that two or more metal-containing catalyst materials may be deposited on the alumina film. For example, copper and chromium may be co-deposited from a solution of their nitrate salts. The co-deposits may be then calcined or otherwise activated. In this manner, a co-deposit of copper and chromium results in a catalyst material comprising copper chromite, usually associated with copper oxide.

Where metal is employed as the material for the extended substrate, the catalytic structure of this invention having the catalyst material deposited thereon functions substantially as an isothermal surface. During the catalytic oxidation of exhaust gases, heat transfer from the catalyst bed is readily accomplished by means of the extended metal substrate. During the initial starting period when the operating temperature is low, heat is conducted throughout the catalyst structure thereby bringing the structure up to operating temperatures. On the other hand, when the temperature is high, heat transfer rates are greater and the metal substrate will conduct the heat to the surroundings thereby facilitating dissipation of heat. Thus, the metal substrate provides an adequate means for controlling the temperature conditions in the catalytic structure.

The structure is preferably formed from a substrate comprising an aggregate of stainless steel wool. If desired, metal knitted mesh or screen or various combinations of metal fibers in the form of filaments, wires, rods, or the like, randomly disposed or in woven, knit, wound, interlaced, bundled, baled, or wrapped form. Woven metal fabric, e.g., stainless steel screen, may be employed to hold stainless steel wool or knit mesh in a desired shaped form, e.g., in cylindrical form and may be spirally or concentrically disposed through the cartridge. The catalytic element may be encased in or surrounded by a metal casing, e.g., sheet metal to form a cartridge. The catridge may be open at one or both ends and may be imperforate or perforated. One or more cartridges may make up the catalytic element and each cartridge may contain one or more catalyst structures.

In a preferred embodiment, the substrate of the catalyst structure is made up of coarse grade stainless steel wool, e.g., steel wool having a fiber thickness of 4 to 7 mils and width of 8 to 12 mils, encased in an imperforate cylindrical metal casing open at both ends for longitudinal flow of gases therethrough. In another preferred embodiment, the substrate is encased in a metal casing perforated on two sides to permit cross-flow of gases therethrough. The substrate is preferably encased prior to coating with the alumina film so that the alumina coats not only the metal fibers, but also coats the casing thereby bonding the metal fibers substrate to the inside wall of the casing. This provides added rigidity to the substrate and prevents blowby of exhaust gases. The alumina coated substrate can then be impregnated with one or more catalysts.

In one specific embodiment, one longitudinal portion of the encased alumina-coated fibrous substrate and alumina-coated inner surface of the casing are impregnated with vanadium pentoxide and the other portion of the alumina-coated substrate and casing are impregnated with a copper oxide-copper chromite complex. Alternatively, separate cartridges with the different catalysts can be fitted end to end in a suitable container, e.g., an acoustic muffler.

In another embodiment of this invention, the catalytic structure is provided in the form a metal tube, e.g., steel, of relatively small inside diameter. The inside diameter of the tube, in general, may range from about 0.05 inch to 2 inches, preferably 0.25 to 1 inch, but is dependent somewhat upon the combustion system. The alumina film is formed on at least one surface or wall of the tube, and the catalyst material is then deposited on the alumina film. The tube should be of a length sufficient to accomplish the desired catalytic oxidation of the combustible compounds. A number of parallel tubes housed in a single unit may be employed, and the tubes incorporated into the muffler. Where desired, the tubular catalytic structure may comprise a portion or all of the exhaust pipe.

In the following examples, which further illustrate this invention, the catalytic structures prepared were evaluated for use as an oxidation catalyst in the exhaust system of an internal combustion engine, as described below in greater detail.

*Example I*

A sodium aluminate solution was prepared by dissolving 586 grams of sodium hydroxide in 10 liters of water contained in a battery jar, and adding thereto 384 grams of aluminum pills. A round 6 mil metal knitted mesh consisting of a nickel-chromium-iron alloy and marketed under the trademark Inconel by Metal Textile Corp., was wrapped on a stainless steel screen measuring 6 inches by 10 inches and was then rolled into a cartridge 6" in length and 2" in diameter. The metal mesh cartridge, which weighed 183 grams, was immersed in the sodium aluminate solution maintained at about 150° F. The cartridge was rotated periodically and remained in the solution for 20 hours in order that the metal mesh might be uniformly coated with alumina. The cartridge was then removed from the solution, and washed thoroughly with water. The cartridge, having an adherent film of alumina formed thereon, was dried at 300° F. for 1 hour, then at 500° F. for 1 hour, and finally at 1000° F. for 1 hour. As a result of the drying and heating, the alumina film comprised essentially gamma alumina. The total weight of the cartridge was 252 grams, the alumina film weighing about 69 grams.

The alumina film formed on the metal mesh cartridge was impregnated with a vanadium oxide catalyst material as follows:

The solution of catalyst containing material was prepared by first dissolving 115 grams of tartaric acid in 900 milliliters of water. To this solution was added 50 grams of ammonium vanadate, and the resulting solution was diluted to 1000 milliliters. The above prepared metal mesh cartridge was immersed at 400 milliliters of the resulting solution for 10 minutes at about 70° F., and the solution then drained. The cartridge was then heated at 300° F. for 1 hour in air. This procedure was repeated eight times. After the final soaking, the treated cartridge was heated in air at 300° F. for 1 hour, then at 500° F. for 1 hour, and subsequently at 1000° F. for 1 hour. The total weight for the cartridge was 267 grams.

*Example II*

A metal mesh cartridge as employed in Example I was coated with a film of gamma alumina as described above. The final weight of the cartridge was 244 grams, the weight of the alumina film being about 61 grams.

A catalyst containing solution was prepared by dissolving 121 grams of copper nitrate trihydrate and 200 grams of chromic nitrate nonahydrate in 1000 milliliters of water.

The metal mesh cartridge was immersed in 195 milliliters of the above prepared solution for 10 minutes at about 70° F. The solution was then drained, and the cartridge was dried at 300° F. for 1 hour in air. This procedure was repeated 4 times, except after the fourth soaking, the cartridge was heated in air at 300° F. for 1 hour, then at 500° F. for 1 hour, and then at 1000° F. for 1 hour. The total weight for the cartridge was 253 grams.

Each of the prepared catalytic structures employed in Examples I and II above were evaluated for use as an oxidation catalyst in the exhaust system of an ASTM-Coordinating Fuel Research engine (a single cylinder engine), using premium grade motor gasoline containing 2.2 milliliters of tetraethyllead per gallon. In making the evaluation, a catalytic structure prepared in the above examples was contained in a chamber and inserted about midway in the exhaust pipe. The ports of the carburetor were opened so that the fuel to air ratio was about 0.062. A blank run was conducted employing no catalytic material. In each run, an analysis of the exhaust gases was made with a flame ionization analyzer detector manufactured by Carad Corporation. In the run employing no catalyst, an analysis of the exhaust gases showed a hydrocarbon content as carbon atoms per million (c.p.m.) of about 3600 at 800° F. and about 4000 at 950° F. When the catalytic cartridge of Example I was employed, the hydrocarbon content as c.p.m. decreased to 2600 at 800° F., and to 1600 at 950° F. In testing the catalytic structure of Example II, the hydrocarbon content as c.p.m. decreased to 1600 at 800° F., and 600 at 950° F. The foregoing readily illustrates the substantial benefit gained in employing the catalyst.

*Example III*

A metal mesh cartridge purchased from Otto York Co. made of rolled crimped 11 mil Inconel wire weighting 579 grams was coated with a film of gamma alumina as in Example I. The weight of alumina-coated cartridge was 2050 grams, the weight of the alumina film being about 1471 grams. The alumina film was then impregnated with a vanadia catalyst as in Example I, and the total weight for the cartridge was 2238 grams.

The catalytic structure was evaluated for use as an oxidation catalyst in the exhaust system of an 8 cylinder, 1960 Oldsmobile engine using premium grade motor gasoline containing about 2.2 milliliters of tetraethyllead per gallon. In making the evaluation, two runs were conducted, and in each run additional air at room temperature was introduced in the exhaust manifold outside of the exhaust ports but before the catalyst chamber. In the first run, the prepared catalytic structure was contained in a chamber which was then inserted in the exhaust in place of the conventional muffler. In the second run, no catalyst was employed. An analysis of the exhaust gases was made simulating the California Motor Vehicle Pollution Control Board cycle, Second Draft May 18, 1961, "Test Procedure for Vehicle Exhaust Emission," with the Carad detector as in the above examples, but corrected for secondary air dilution. In the blank run employing no catalyst, an analysis showed an adjusted carbon content as hexane in parts per million of 418. When the catalytic structure was employed, the adjusted carbon content as hexane decreased to 147 parts per million thereby illustrating the substantial benefit gained in employing the catalyst.

*Example IV*

Three tubes, each 4¾ inches in diameter and 15 inches long were filled with coarse stainless steel wool. The metal tubes weighed 414, 415 and 416 grams, and contained 1269, 1261, and 1265 grams of stainless steel wool, respectively. The stainless steel wool and surfaces of the tube were coated with alumina by a procedure similar to that described in Example I except that the cartridges were maintained in a vertical position in the sodium aluminate solution. Sufficient sodium hydroxide solution was used to immerse the tubes and additional aluminum pellets were added from time to time so that metallic aluminum was present during the entire coating period. Hydrogen escaping from the reaction of the metallic aluminum with the sodium hydroxide passed up through the cartridges, keeping the solution agitated and providing a substantially uniform coating on the metal surfaces. The stainless steel wool was securely bonded to the tubular container by the alumina coating. The alumina coatings, after calcining, weighed 1023, 1006 and 1013 grams, respectively. The alumina coated cartridges were then impregnated with catalyst. One half of the cartridge was impregnated with vanadium oxide catalyst as in Example I by immersing only one half, longitudinally, of each cartridge in the ammonium vanadate solution. After impregnation of one half with the vanadium oxide catalyst, the other half of each cartridge was impregnated with copper oxide-copper chromite catalyst corresponding to the theoretical formula $CuO \cdot CuCr_2O_4$, as in Example II. The total catalyst weight was 160, 177 and 200 grams, respectively, for the three cartridges. The cartridges were assembled in a parallel arrangement so that exhaust gases passed first over the vanadium oxide catalyst section of the tubes and then over the copper oxide-copper chromite catalyst. The total volume of the catalytic structure was about 13.0 liters: 6.5 liters comprising vanadium oxide catalyst and 6.5 liters comprising copper oxide-copper chromite catalyst. The catalytic structure was then evaluated in the exhaust system of an 8 cylinder, 1960 Oldsmobile engine at 1800 r.p.m. for the equivalent of 11,250 miles. This combination of catalysts showed a reduction in hydrocarbon content of the exhaust gases of about 90 percent initially, about 86 percent at 5,000 miles, 80 percent at 9,000 miles and 75 percent at the end of the evaluation period, equivalent to 11,250 miles of driving.

Odor of the exhaust gases was noted by a panel of individuals as objectionable for the all vanadium oxide catalyst of Example III and as less objectionable than untreated exhaust gases for the combination of vanadium oxide catalyst followed by the copper oxide-copper chromite catalyst as in this example.

*Example V*

Three tubular catalyst cartridges, each 4¾ inches in diameter and 16 inches long, were prepared as in Example IV except that the alumina coated cartridges were impregnated only with copper oxide-copper chromite catalyst as in Example II. The weights, in grams, of the components of the cartridges are shown below:

| Tube | S.S. Wool | Coating | Catalyst |
|------|-----------|---------|----------|
| 412  | 1,281     | 964     | 185      |
| 419  | 1,253     | 966     | 172      |
| 402  | 1,284     | 989     | 176      |

These catalytic elements were assembled and tested in the 1960 Oldsmobile engine as in Example IV. Initial activity was about 90 percent, dropping gradually to about 80 percent at 2,500 miles, 75 percent at 6,000 miles and 50 percent at the end of the evaluation, equivalent to 11,250 miles. The odor panel judged the odor of the exhaust gases from this catalyst less objectionable than that of the catalyst of Example IV.

I claim:
1. A catalytic structure comprising:
   (a) a tubular casing;
   (b) metal wool substrate contained within said casing;
   (c) an adherent film of alumina formed on said substrate and the interior of said casing thereby bonding said substrate and said casing together in a unitary structure, said adherent film of alumina being formed by
       (1) contacting said substrate and said casing with an aqueous solution of an alkali metal aluminate for a period of time sufficient to form an adherent film of alumina trihydrate on said substrate and said casing wherein the solution temperature is at least room temperature,
       (2) subsequently, separating said substrate and said casing with said adherent film of alumina trihydrate from said solution, and
       (3) then, heating said substrate, said casing and said film of alumina trihydrate under calcining conditions for sufficient time to at least dehydrate said alumina trihydrate, and;
   (d) an oxidation catalyst deposited on said alumina and adherent thereto.
2. A process for preparing a catalytic structure for use in effecting substantially complete oxidation of carbon monoxide and hydrocarbons contained in automobile exhaust gases which comprises:
   (a) inserting a metal wool substrate in the interior of a tubular casing;
   (b) contacting said substrate and said casing with an aqueous solution of an alkali metal aluminate for a period of time sufficient to form an adherent film of alumina trihydrate on said substrate and said casing wherein the solution temperature is at least room temperature;
   (c) subsequently, separating said substrate and said casing with said adherent film of alumina trihydrate from said solution, and
   (d) then, heating said substrate, said casing and said film of alumina trihydrate under calcining conditions for sufficient time to at least dehydrate said alumina trihydrate, and;
   (e) finally, depositing an oxidation catalyst on said alumina film.
3. A process for effecting substantially complete oxidation of carbon monoxide and hydrocarbons contained in automobile exhaust gases which comprises:
   contacting said gases with a catalytic structure comprising
   (a) a tubular casing;
   (b) metal wool substrate contained within said casing;
   (c) an adherent film of alumina formed on said substrate and the interior of said casing thereby bonding said substrate and said casing together in a unitary structure, said adherent film of alumina being formed by
       (1) contacting said substrate and said casing with an aqueous solution of an alkali metal aluminate for a period of time sufficient to form an adherent film of alumina trihydrate on said substrate and said casing wherein the solution temperature is at least room temperature;
       (2) subsequently, separating said substrate and said casing with said adherent film of alumina trihydrate from said solution, and
       (3) then, heating said substrate, said casing and said film of alumina trihydrate under calcining conditions for sufficient time to at least dehydrate said alumina trihydrate, and;
   (d) an oxidation catalyst deposited on said alumina and adherent thereto.
4. A process according to claim 4 wherein air is admixed with said gases prior to contact with said catalytic structure.

References Cited

UNITED STATES PATENTS

| | | | |
|---|---|---|---|
| 2,580,806 | 1/1952 | Malina | 252—463 |
| 2,742,437 | 4/1956 | Houdry | 252—477 |
| 3,147,154 | 9/1964 | Cole et al. | 252—439 X |
| 3,155,627 | 11/1964 | Cole et al. | 252—477 |
| 3,231,520 | 1/1966 | Leak et al. | 23—2 X |

OTHER REFERENCES

Jacobson; "Encyclopedia of Chemical Reactions," Reinhold Publishing Company, New York, N.Y. 1946, volume I, page 171.

OSCAR R. VERTIZ, *Primary Examiner.*

EARL E. THOMAS, *Assistant Examiner.*

UNITED STATES PATENT OFFICE
CERTIFICATE OF CORRECTION

Patent No. 3,362,783  January 9, 1968

Robert J. Leak

It is certified that error appears in the above identified patent and that said Letters Patent are hereby corrected as shown below:

Column 10, line 51, the claim reference numeral "4" should read -- 3 --.

Signed and sealed this 29th day of July 1969.

(SEAL)
Attest:

Edward M. Fletcher, Jr.
Attesting Officer

WILLIAM E. SCHUYLER, JR.
Commissioner of Patents